(12) United States Patent
Kyung et al.

(10) Patent No.: US 9,157,815 B2
(45) Date of Patent: Oct. 13, 2015

(54) APPARATUS FOR SENSING PRESSURE USING OPTICAL WAVEGUIDE AND METHOD THEREOF

(75) Inventors: Ki Uk Kyung, Daejeon (KR); Young Sung Kim, Seoul (KR); Sun Tak Park, Daejeon (KR); Il Yeon Cho, Daejeon (KR); Jun Seok Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 608 days.

(21) Appl. No.: 13/524,794

(22) Filed: Jun. 15, 2012

(65) Prior Publication Data

US 2012/0318074 A1 Dec. 20, 2012

(30) Foreign Application Priority Data

Jun. 17, 2011 (KR) .......................... 10-2011-0058979

(51) Int. Cl.
*G01L 9/00* (2006.01)
*G01L 1/24* (2006.01)
*G06F 3/042* (2006.01)

(52) U.S. Cl.
CPC ............... *G01L 1/243* (2013.01); *G01L 9/0077* (2013.01); *G06F 3/0421* (2013.01); *G06F 2203/04109* (2013.01)

(58) Field of Classification Search
CPC ............. G01L 1/04; G01L 1/26; G01L 1/241; G01L 9/0077; G01L 11/02
USPC .................. 73/862.621, 862.624, 705
See application file for complete search history.

(56) References Cited

U.S. PATENT DOCUMENTS

| | | | | |
|---|---|---|---|---|
| 5,357,813 | A * | 10/1994 | Weinberger | .................. 73/865.7 |
| 7,711,230 | B2 * | 5/2010 | Khan | ............................ 385/129 |
| 7,941,017 | B2 * | 5/2011 | Juni | ................................ 385/33 |
| 2006/0034566 | A1 * | 2/2006 | Wakita et al. | ................... 385/31 |
| 2008/0181566 | A1 * | 7/2008 | Shimizu | ........................ 385/120 |
| 2011/0072886 | A1 * | 3/2011 | Caneau et al. | ............... 73/24.02 |
| 2011/0116737 | A1 * | 5/2011 | Kim et al. | ........................ 385/14 |

FOREIGN PATENT DOCUMENTS

| | | |
|---|---|---|
| KR | 10-2007-0066810 A | 6/2007 |
| KR | 10-2008-0008064 A | 1/2008 |
| KR | 10-2009-0011686 A | 2/2009 |
| KR | 10-2010-0033076 A | 3/2010 |

OTHER PUBLICATIONS

IM KR1020090011686 Gong KR1020070066810.*

* cited by examiner

*Primary Examiner* — Lisa Caputo
*Assistant Examiner* — Nigel Plumb

(57) ABSTRACT

Disclosed are an apparatus and a method for sensing pressure using an optical waveguide sensor. The apparatus for sensing pressure using an optical waveguide sensor, includes: a light source radiating light; an optical waveguide panel emitting some of the radiated light outside through a plurality of light transmitting regions previously formed, and changing an amount of totally reflected light according to pressure applied to at least one of the plurality of light transmitting regions; a detector detecting the amount of light; and an analyzer determining intensity and a location of the pressure according to the detected amount of light.

16 Claims, 8 Drawing Sheets

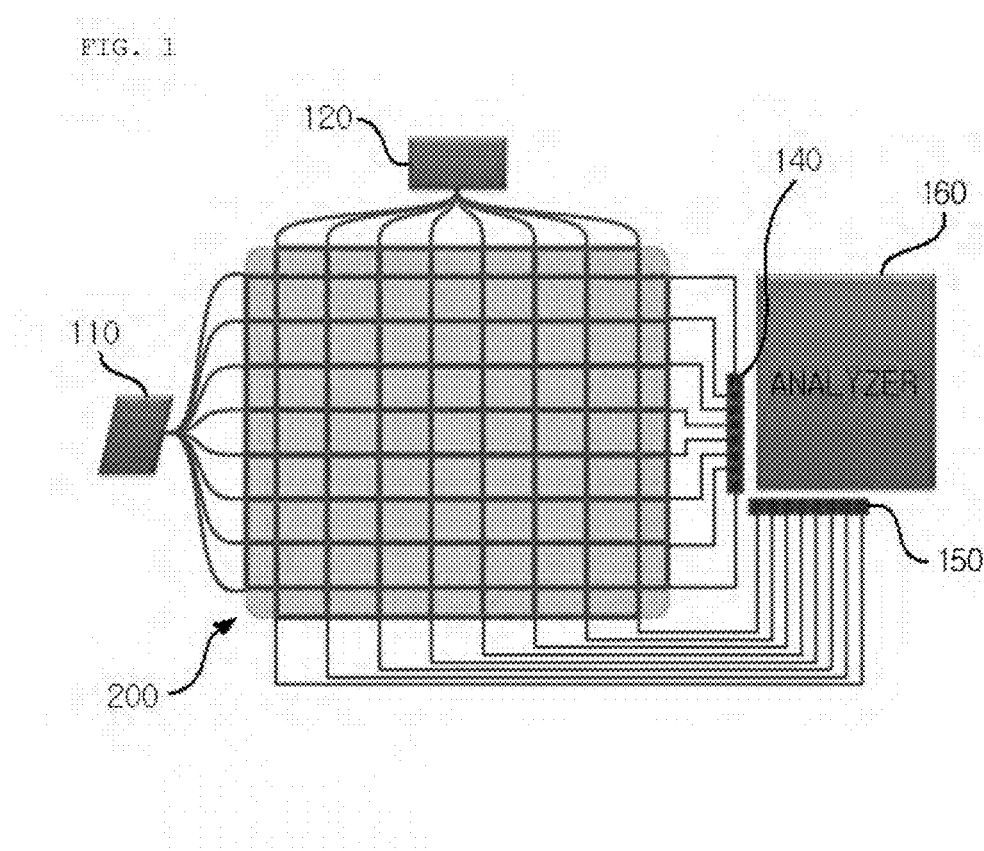

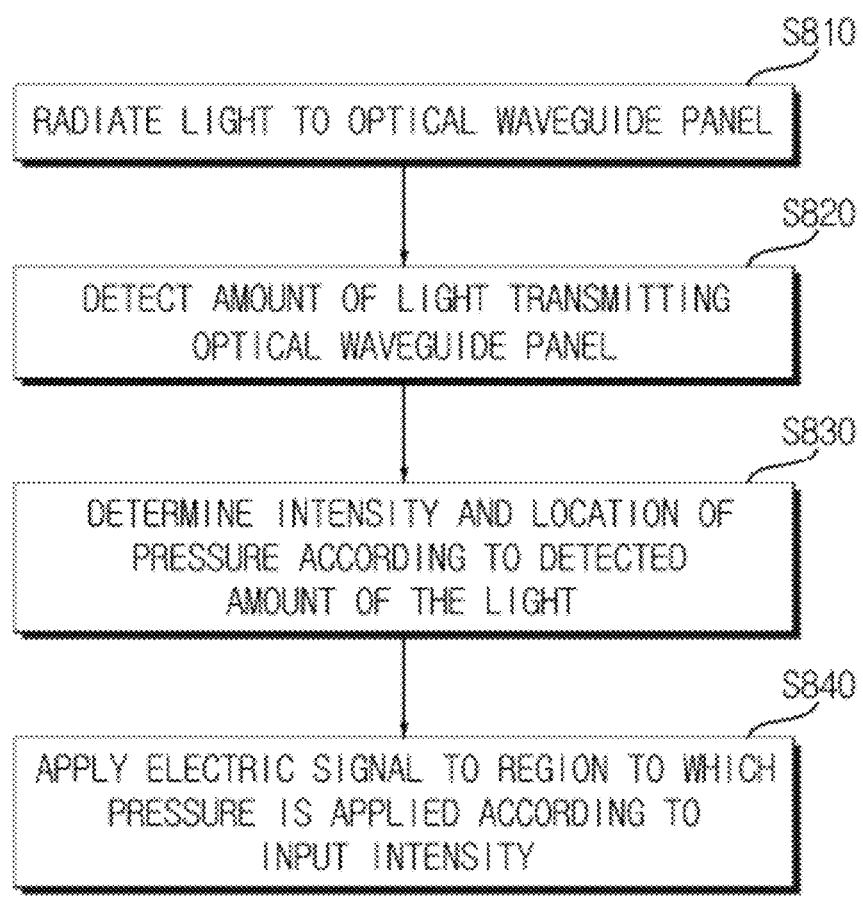

APPARATUS FOR SENSING PRESSURE USING OPTICAL WAVEGUIDE AND METHOD THEREOF

CROSS-REFERENCE TO RELATED APPLICATIONS

This application claims priority to and the benefit of Korean Patent Application No. 10-2011-0058979 filed in the Korean Intellectual Property Office on Jun. 17, 2011, the entire contents of which are incorporated herein by reference.

TECHNICAL FIELD

The present invention relates to a method for sensing pressure according to touch, and more particularly, to an apparatus for sensing pressure using an optical waveguide which may measure a change in an amount of light passing through the optical waveguide when pressure is applied to the optical waveguide and sense intensity and a location of the applied pressure according to the measured change in the amount of the light, and a method thereof.

BACKGROUND ART

In general, a touch pad is an input device that may sense a location of a contact point by contacting another object such as a finger or a pen on a pad location of a point corresponding to a screen of a display device. In recent years, the touch pad has been used as a representative method instead of a mouse of a notebook computer. A touch screen is a device that a user contacts a picture or a character visually displayed on a screen by hand or with a pen to perform a command by attaching a transparent sensor having the same size as that of a display device to a screen coordinate and a contact point coordinate to correspond to each other.

The types of the foregoing touch panel and touch screen may be classified for each medium sensing a contact signal. There are a resistive type, a surface acoustic wave (SAW) type, a capacitive type, and the like as representative types of the touch pad or the touch screen.

In a resistive type touch screen panel, insulation bars are provided between a glass or transparent plastic plate and a polyester film using a resistive material at predetermined distance such that the glass or transparent plastic plate and the polyester film do not contact in such a way that the resistive material is coated on the glass or transparent plastic plate and the polyester film is covered thereon. When the user touches the resistive type touch screen panel, a resistance value varies and an applied voltage also varies due to a physical change in the insulation bars. A contact location is recognized according to the variation in the applied voltage.

The SAW type touch screen panel includes a transmitter, a reflector, and a receiver. The transmitter generates an ultrasonic wave and is attached to one corner of glass. The reflector reflects a sound wave and is spaced apart from the transmitter by a predetermined distance. The receiver is attached to another side of the reflector. When a panel contacts an object such as a finger preventing the sound wave, some ultrasonic wave is absorbed. The SAW type touch screen panel uses a method of calculating a location where the change occurs and simultaneously recording a contact location.

In a capacitive type touch screen, when both sides of glass are coated with a transparent special conductive metal and a voltage is applied to four corners of a screen, a high frequency is generated on a surface of the touch screen. In this case, if a conductive object such as a user's finger contacts on the capacitive type touch screen, a high frequency component become low. Such digital data is analyzed by a controller to find out a contact location. The method is not influenced by external factors and a panel has high transparency and thus is the most frequently used technology.

An infrared type touch screen uses straight attribute of light, and is a technology using an attribute that is blocked and is not advanced when there is an obstacle. In a basic structure of a panel, a plurality of infrared light emitting diodes being an emission device and a photo-transistor being a receiving device are disposed to face each other, and an optical grating frame is made and mounted around a front cover of a monitor. An object such as a finger touches the infrared type touch screen, because light is blocked and is not sensed by a photo-transistor of an opposite side, a touched location of a cell is recognized.

Because only on/off of an existing touch pad is sensed based on an input signal, whether an operation is performed suited to the intention of a user can be known by only a change in a corresponding picture or button. Accordingly, because an error with respect to a desired operation of the user can be appreciated according to presence of a function operation, delay occurs for some time. When the touch pad is used by only on/off input as described above, sensitivity of the touch pad may not be adjusted, operation erroneously performed cannot be prevented when a key is strongly input.

An existing touch screen touches a screen based on a screen, namely, a panel to recognize a location, and may perform a multi-touch function, a drag function, and the like in some cases. However, the multi-touch function, the drag function, and the like are performed by a method capable of being used in a plane, and thus it is difficult to implement a previous resolution and precision in an irregular side. As in the touch pad, because the existing touch screen recognizes only on/off input, namely, touch, the touch screen may cause an erroneous operation of desired input.

Such problems occur because the touch screen cannot recognize pressure which the user applies.

SUMMARY OF THE INVENTION

The present invention has been made in an effort to provide an apparatus for sensing pressure using an optical waveguide which may measure a change in an amount of light passing through the optical waveguide when pressure is applied to the optical waveguide and sense intensity and a location of the pressure according to the measured change in the amount of light, and a method thereof.

The present invention further provides an apparatus for sensing pressure using an optical waveguide which may sense the intensity of pressure by using a change in amount of light passing through the optical waveguide and sense intensity and a location of the pressure so as to allow a user to recognize the sensed intensity of pressure, and a method thereof.

However, an object of the present invention is not limited to the above-mentioned matters, and other non-mentioned objects will become apparent to those skilled in the art based on the following explanation.

An exemplary embodiment of the present invention provides an apparatus for sensing pressure using an optical waveguide sensor, including: a light source radiating light; an optical waveguide panel emitting some of the radiated light to the outside through a plurality of light transmitting regions previously formed, and changing an amount of totally reflected light according to pressure applied to at least one of the plurality of light transmitting regions; a detector detecting the amount of light; and an analyzer determining intensity and a location of the pressure according to the detected amount of light.

The optical waveguide panel may include: a first cladding layer; a core layer formed in an upper portion of the first cladding layer in a grating pattern, and totally reflecting and transmitting the light radiated from the light source; and a second cladding layer formed in an upper portion of the first cladding layer on which the core layer is formed, and having the light transmitting region where holes are formed at a predetermined interval at the upper portion of the core layer, and some of the light passing through the core layer are emitted to the outside through the formed holes.

The optical waveguide panel may include: a first cladding layer; a core layer formed in an upper portion of the first cladding layer in a grating pattern, and having the light transmitting region on which the first cladding layer has a bent shape at a predetermined interval, and some of light radiated from the light source are emitted to the outside; and a second cladding layer formed in an upper portion of the first cladding layer on which the core layer is formed.

The optical waveguide panel may include: a first cladding layer; a core layer formed in an upper portion of the first cladding layer in a grating pattern, and totally reflecting and transmitted to the light radiated from the light source; a second cladding layer formed in an upper portion of the first cladding layer on which the core layer is formed; and a photo elastic layer inserted into the second cladding layer at a predetermined interval and emitting some of the light passing through the core layer to the outside.

The photo elastic layer may use a photo elastic material having a refraction index different from that of the second cladding layer, and a side of the photo elastic layer may contact the core layer.

The optical waveguide panel includes an electric elastic layer that may be formed in a lower portion of the first cladding layer, and receiving an electric signal according to the intensity of the pressure applied to the light transmitting region such that physical properties in the electric elastic layer vary.

When the electric elastic layer receives the electric signal, the physical properties in the electric elastic layer may vary left and right.

When the electric elastic layer receives the electric signal, the physical properties in the electric elastic layer may vary upward and downward.

The more the amount of light is, the higher the intensity of the pressure may be, and the less the amount of light is, the lower the intensity of the pressure may be.

Another exemplary embodiment of the present invention provides an apparatus for sensing pressure using an optical waveguide sensor, including: a light source radiating light; an optical waveguide panel emitting some of the radiated light to the outside through a plurality of light transmitting regions previously formed, and changing an amount of light totally reflected according to pressure applied to at least one of the plurality of light transmitting regions; a detector detecting the amount of light; and an analyzer determining intensity and a location of the pressure according to the detected amount of light, wherein the optical waveguide panel receives an electric signal from the analyzer according to the intensity of the pressure, and physical properties in the optical waveguide panel vary in a region to which the pressure is applied.

When the optical waveguide panel receives the electric signal, the physical properties in the optical waveguide panel may vary left and right.

When the optical waveguide panel receives the electric signal, the physical properties in the optical waveguide panel may vary upward and downward.

The more the amount of light is, the higher the intensity of the pressure may be, and the less the amount of light is, the lower the intensity of the pressure may be.

Yet another exemplary embodiment of the present invention provides a method for sensing pressure using an optical waveguide sensor, including: radiating light to an optical waveguide panel to emit some of the light outside through a plurality of light transmitting regions previously formed; detecting an amount of light changed according to pressure applied to at least one of the plurality of light transmitting regions; and determining intensity and a location of the pressure according to the detected amount of the light.

The method may further include applying an electric signal to a region to which pressure of the optical waveguide panel is applied according to the intensity of the pressure to vary physical properties in the region.

The varying of the physical properties may include applying an electric signal to a region to which pressure of the optical waveguide panel is applied according to the intensity of the pressure to vary physical properties in a left side and a right side of the region.

The varying of the physical properties may include applying an electric signal to a region to which pressure of the optical waveguide panel is applied according to the intensity of the pressure to vary physical properties in up and down directions of the region.

The more the amount of light is, the higher the intensity of the pressure may be, and the less the amount of light is, the lower the intensity of the pressure may be.

According to exemplary embodiments of the present invention, it is possible to measure a change in an amount of light passing through the optical waveguide when pressure is applied to the optical waveguide and to sense intensity and a location of the applied pressure according to the measured change in the amount of light, thereby more precisely detecting the intensity and location of the pressure.

It is also possible to sense the intensity of the pressure by using a change in an amount of light passing through the optical waveguide according to the applied pressure to allow a user to recognize the sensed pressure intensity, thereby controlling the pressure intensity.

It is also possible to sense the intensity of the pressure by using a change in an amount of light passing through the optical waveguide according to the applied pressure to allow a user to recognize the sensed intensity of the pressure, thereby implementing various user interfaces.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is an exemplary diagram illustrating an apparatus for sensing pressure according to an exemplary embodiment of the present invention.

FIG. 8 is an exemplary diagram illustrating a method for sensing pressure according to an exemplary embodiment of the present invention.

Figure 2A:
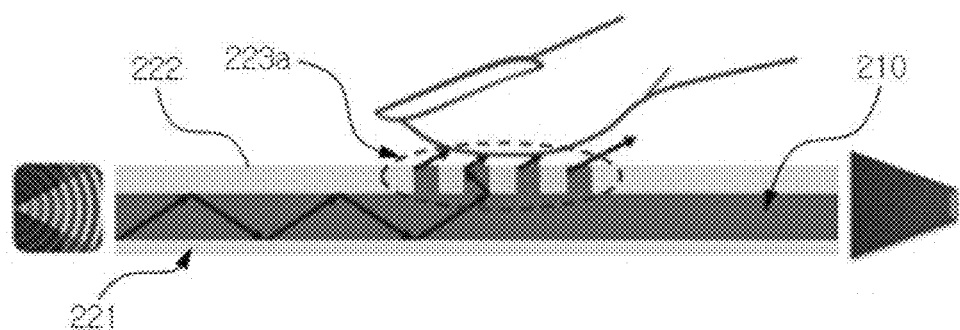
FIGS. 2A, 2B and 2C are first exemplary diagrams illustrating a principle for sensing pressure according to the exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus and a method for sensing pressure using an optical waveguide according to exemplary embodiments of the present invention will be described in detail with reference to the accompanying drawings, namely, FIGS. 1 to 8. The exemplary embodiments of the present invention will be described in detail based on parts necessary to understand operations and functions of the present invention. Throughout the specification, in giving reference numerals to elements of each drawing, like reference numerals refer to like elements even though like elements are shown in different drawings.

An exemplary embodiment of the present invention suggests an approach which may measure a change in an amount of light passing through an optical waveguide when pressure is applied to the optical waveguide and sense intensity and a location of the applied pressure according to the measured change in the amount of light, and may allow a user to recognize the sensed intensity of the pressure, and a method thereof. Here, the optical waveguide refers to an optical fiber designed such that an optical signal is transferred.

FIG. 1 is an exemplary diagram illustrating an apparatus for sensing pressure according to an exemplary embodiment of the present invention.

As shown in FIG. 1, the apparatus for sensing pressure according to the exemplary embodiment of the present invention may include a first light source 110, a second light source 120, an optical waveguide panel 200, a first detector 310, a second detector 320, and an analyzer 400, as a user input device for sensing pressure according to touch. For example, the user input device may be a concept generally including a key pad, a touch pad, a touch screen, and the like.

The first light source 110 and the second light source 120 may radiate light to the optical waveguide panel 200, respectively. For example, the first light source 100 may radiate the light in a transverse direction of the optical waveguide panel 200, and the second light source 120 may radiate the light in a longitudinal direction of the optical waveguide panel 200.

The optical waveguide panel 200 may include a core layer 210 transmitting light and a cladding layer 220 surrounding the core layer 210 and preventing light from being emitted to the outside of the core layer 210. Here, the core layer 210 and the cladding layer 220 have different refraction indexes such that the core layer 210 totally reflects and transmits the light. The core layer 210 may be formed in a grating pattern.

The optical waveguide panel 200 may transmit the light, and an amount of the transmitted light is changed according to intensity of pressure applied from the user. Particularly, the optical waveguide panel 200 radiates some of the light outside through a plurality of light transmitting regions previously formed, and changes an amount of totally reflected light according to pressure applied to at least one of the plurality of light transmitting regions.

That is, the higher the intensity of the pressure is, the more the amount of light passing through the optical waveguide panel 200 is. The lower the intensity of the pressure is, the less the amount of light passing through the optical waveguide panel 200 is.

The light transmitting region may be implemented in various forms, and several examples thereof will be described below.

The optical waveguide panel 200 may return a physical stimulation to the user according to a change in the amount of light. Here, the physical stimulation may refer to tactile indicating whether a user contacts or the intensity of the touch. For example, through the function of real-time returning the physical stimulation, functions of various user interfaces, for example, a key pad, a multi-key pad, a touch screen, a mouse, and the like may be implemented.

The first detector 140 may detect an amount of light passing through a plurality of core layers arranged parallel with each other at predetermined intervals in a transverse direction, and the second detector 150 may detect an amount of light passing through a plurality of core layers arranged parallel with each other at predetermined intervals in a longitudinal direction. Here, a photo transistor or the like may be used as the first detector 140 and the second detector 150.

The analyzer 160 may determine a touched intensity and a touched location of the pressure based on the detected amount of the light. The analyzer 160 may apply an electric signal to the optical waveguide panel to apply a physical stimulation to the user according to the intensity of the pressure applied to the light transmitting region.

Figure 2B:
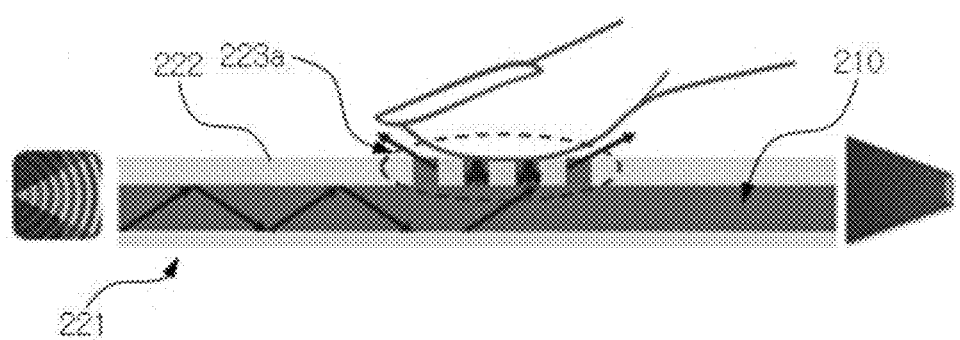
Figure 2C:
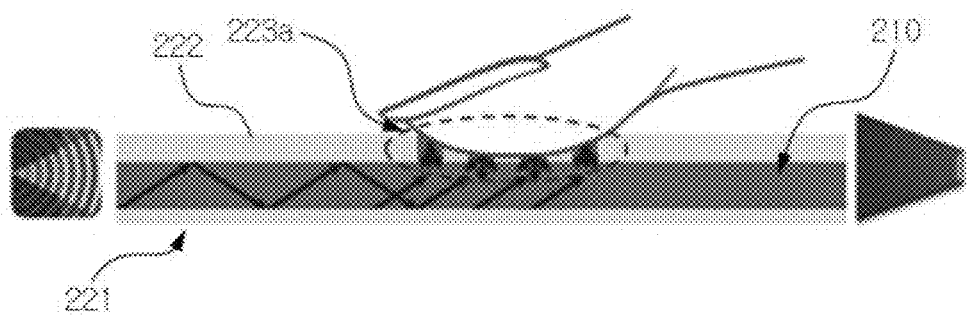

FIGS. 2A, 2B and 2C are first exemplary diagrams illustrating a principle for sensing pressure according to the exemplary embodiment of the present invention.

FIGS. 2A, 2B and 2C are cross-sectional views of the optical waveguide panel 200 according an exemplary embodiment of the present invention. The optical waveguide panel 200 may include a first cladding layer 221, a core layer 210 formed in an upper portion of the first cladding layer 221, a second cladding layer 222 formed in an upper portion of the core layer 210, and the like.

The second cladding layer 222 has a light transmitting region 223a where apertures or holes are formed at a predetermined interval at upper portions of the core layer 210, and some of light passing through the core layer 210 are emitted to the outside through the formed holes. In this case, a distance between the holes may be formed to have 1 mm or less.

In FIG. 2A, if the user does not apply pressure to the optical waveguide panel 200 from the outside, some of the light passing through the core layer 210 are emitted to the outside through all the formed holes.

In FIG. 2B, if the user applies first pressure to a predetermined hole, some of the light passing through the core layer 210 are emitted to the outside through a hole to which the pressure is applied. However, because the amount of light emitted to the outside in FIG. 2B is reduced in comparison with the case of FIG. 2A, an amount of totally reflected and transmitted light is increased. In FIG. 2C, if the user applies second pressure higher than the first pressure hole, an external path of a hole is blocked such that the light passing through the core layer is not emitted to the outside.

In this case, intensity of the first pressure and intensity of the second pressure are set according to the amount of light.

As described above, the amount of light passing through the core layer is changed according to intensity of pressure applied to the hole. That is, the higher the pressure intensity applied to the hole is, the more the amount of light passing through the core layer is. The lower the pressure intensity applied to the hole is, the less the amount of light passing through the core layer is.

Figure 3A:
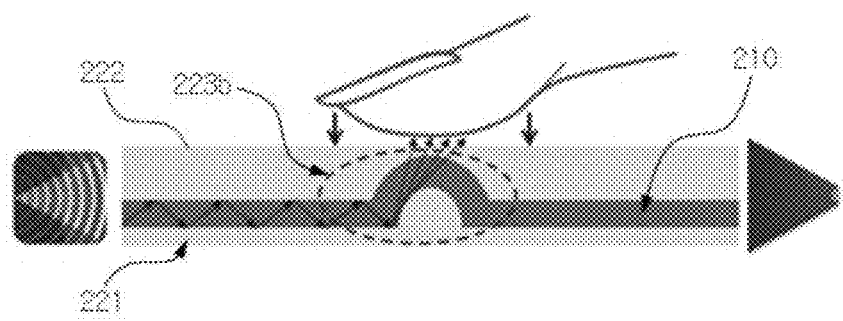
FIGS. 3A, 3B and 3C are second exemplary diagrams illustrating a principle for sensing pressure according to the exemplary embodiment of the present invention.
Figure 3B:
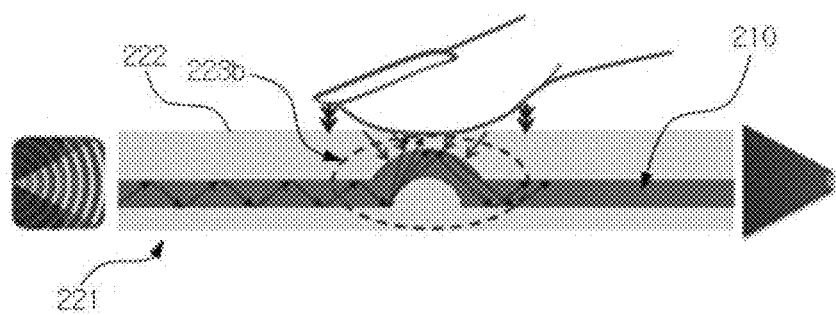
Figure 3C:
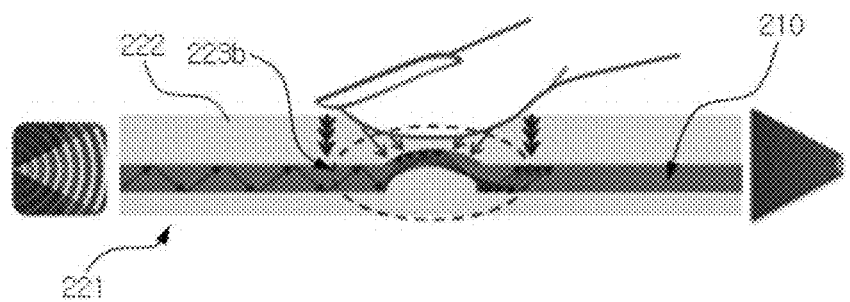

FIGS. 3A, 3B and 3C are second exemplary diagrams illustrating a principle for sensing pressure according to the exemplary embodiment of the present invention.

FIGS. 3A, 3B and 3C are cross-sectional views of the optical waveguide panel according an exemplary embodiment of the present invention. The optical waveguide panel may include a first cladding layer 221, a core layer 210 formed in an upper portion of the first cladding layer 221, a second cladding layer 222 formed in an upper portion of the core layer 210, and the like.

The core layer 210 has a light transmitting region 223b where the first cladding layer 221 has a convex or bent shape at a predetermined interval, and some of light are emitted to the outside at a bent shape. Here, the bent shape may be implemented in various shapes such as a triangle shape, a circle, an ellipse, or a square. In this case, a distance between the bent shapes may be formed to have 1 mm or less.

In FIG. 3A, if the user does not apply pressure from the outside, some of the light passing through the core layer 210 are emitted to the outside through all the bent shapes. In this case, the light is emitted to the first cladding layer 221 or the second cladding layer 222 through the bent shapes.

In FIG. 3B, if the user applies first pressure in a predetermined bent shape, some of the light passing through the core layer 210 are emitted to the outside through a bent shape to which pressure is applied. However, because the amount of light emitted to the outside in FIG. 3B is reduced in comparison with the case of the FIG. 3A, an amount of totally reflected and transmitted light is increased. In FIG. 3C, if the user applies second pressure higher than the first pressure in a predetermined bent shape, the bent shape is spread in a straight shape such that the light passing through the core layer 210 is not emitted to the outside.

As described above, an amount of light passing through the core layer is changed according to intensity of the pressure applied to the bent shape. That is, the higher the intensity of the pressure applied to the bent shape is, the more the amount of the light passing through the core layer is. The lower the intensity of the pressure applied to the bent shape is, the less the amount of the light passing through the core layer is.

Figure 4A:
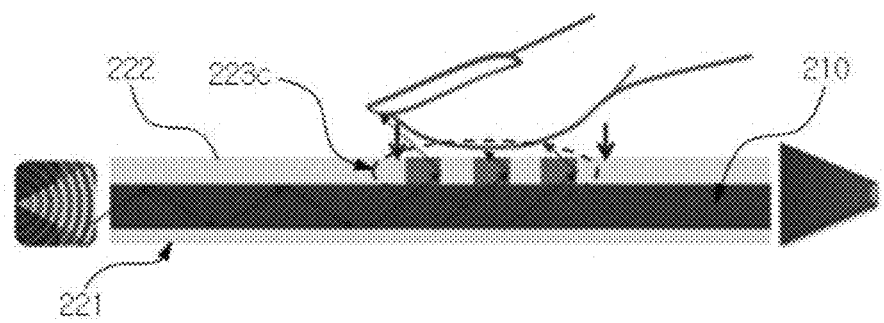
FIGS. 4A, 4B and 4C are third exemplary diagrams illustrating a principle for sensing pressure according to the exemplary embodiment of the present invention.
Figure 4B:
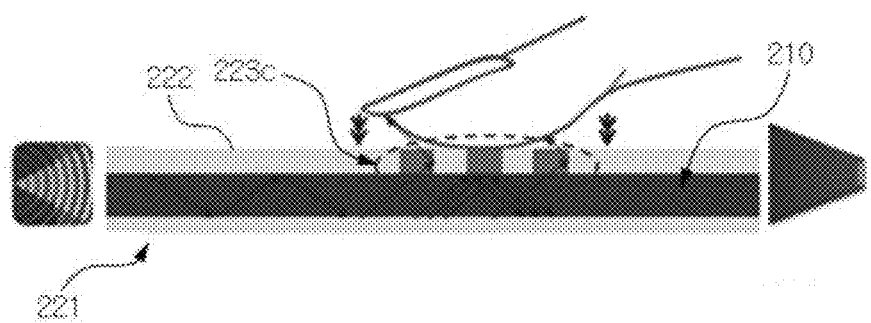
Figure 4C:
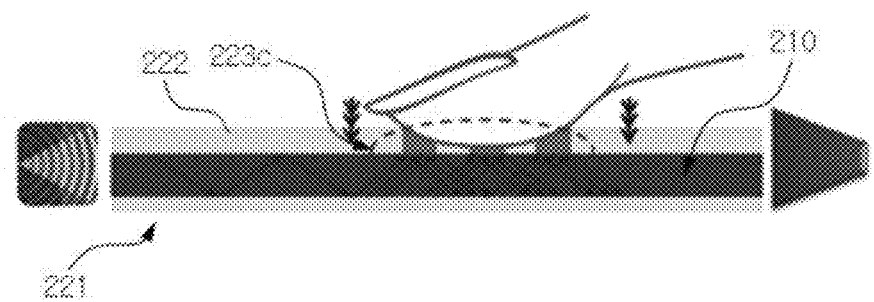

FIGS. 4A, 4B and 4C are third exemplary diagrams illustrating a principle for sensing pressure according to the exemplary embodiment of the present invention.

FIGS. 4A, 4B and 4C are cross-sectional views of the optical waveguide panel 200 according an exemplary embodiment of the present invention. The optical waveguide panel 200 may include a first cladding layer 221, a core layer 210 formed in an upper portion of the first cladding layer 221, a second cladding layer 222 formed in an upper portion of the core layer 210, and a photo elastic layer 223c.

The photo elastic layer 223c is inserted into the second cladding layer 222 at a predetermined interval as a light transmitting region 223c. A side of the photo elastic layer 223c is formed to contact the core layer 210, and the photo elastic layer 223c emits some of the light passing through the core layer 210 to the outside. In this case, the photo elastic layer 223c uses a photo elastic material having a refraction index different from that of the second cladding layer 222. A distance between the photo elastic layers 223c may be formed to have 1 mm or less.

In FIG. 4A, if the user does not apply pressure from the outside, some of the light passing through the core layer are emitted to the outside through all the formed photo elastic layers.

In FIG. 4B, if the user applies first pressure to a predetermined photo elastic layer, some of the light passing through the core layer are emitted to the outside through the photo elastic layer to which pressure is applied. Because the amount of light emitted to the outside in FIG. 4B is reduced in comparison with the case of the FIG. 4A, an amount of totally reflected and transmitted light is increased.

In FIG. 4C, if the user applies second pressure higher than the first pressure to a predetermined photo elastic layer, an external path of a hole is blocked such that the light passing through the core layer is not emitted to the outside.

As described above, an amount of light passing through the core layer is changed according to intensity of the pressure applied to the photo elastic layer. That is, the higher the intensity of the pressure applied to the photo elastic layer is, the more the amount of the light passing through the core layer is. The lower the intensity of the pressure applied to the photo elastic layer is, the less the amount of the light passing through the core layer is.

Figure 5:
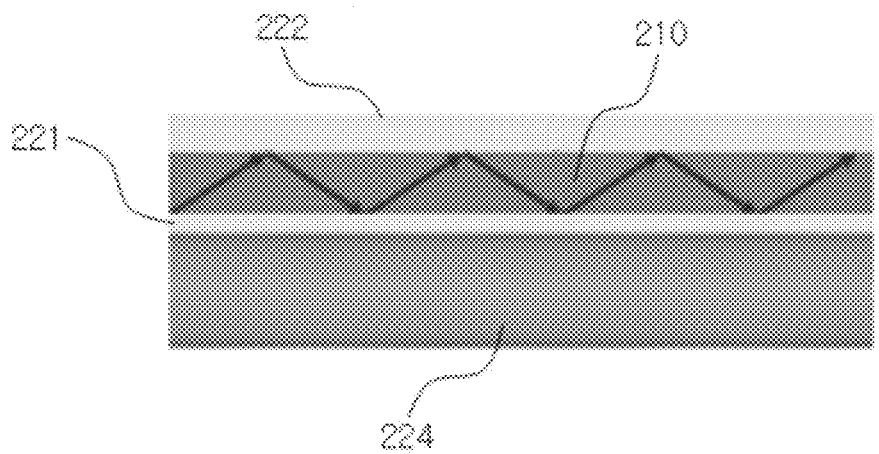
FIG. 5 is an exemplary diagram illustrating another configuration of an optical waveguide panel according to the exemplary embodiment of the present invention.

FIG. 5 is an exemplary diagram illustrating another configuration of an optical waveguide panel according to the exemplary embodiment of the present invention.

FIG. 5 is a partially cross-sectional view of the optical waveguide panel according to an exemplary embodiment of the present invention. The optical waveguide panel may include a first cladding layer 221, a core layer 210 formed in an upper portion of the first cladding layer 221, a second cladding layer 222 formed in an upper portion of the core layer 210, and an electric elastic layer 223c.

The construction of emitting some of light transmitting a core layer to an outside is identical to that shown in FIGS. 2 to 4, and thus the description thereof is omitted.

The electric elastic layer 224 is formed in a lower portion of the first cladding layer 221. When the electric elastic layer 224 receives an electric signal according to the intensity of the pressure applied to a light transmitting region, physical properties in the electric elastic layer 224 vary, that is, the electric elastic layer 224 is contracted or expanded. That is, because a contracted degree of the electric elastic layer 224 is changed according to intensity of pressure, every time the pressure is applied, the electric elastic layer 224 returns a physical stimulation to a user.

In this case, physical properties in the electric elastic layer 224 vary in left and right directions or up and down directions.

Figure 6A:
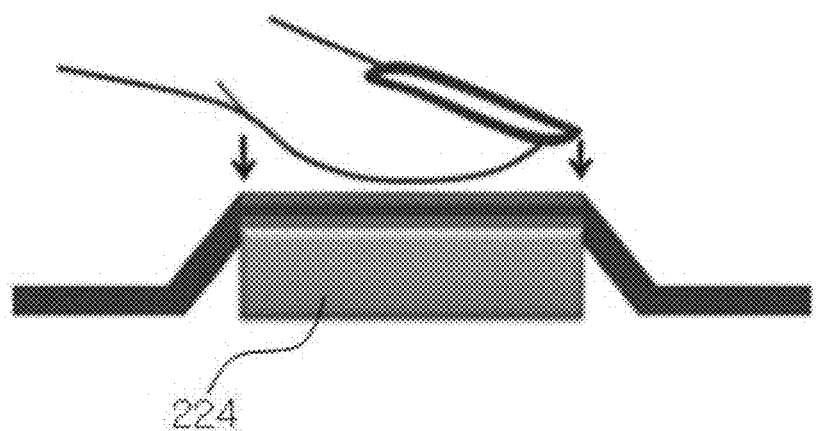
FIGS. 6A, 6B and 6C are exemplary diagrams illustrating a principle for returning a physical stimulation according to the exemplary embodiment of the present invention.
Figure 6B:
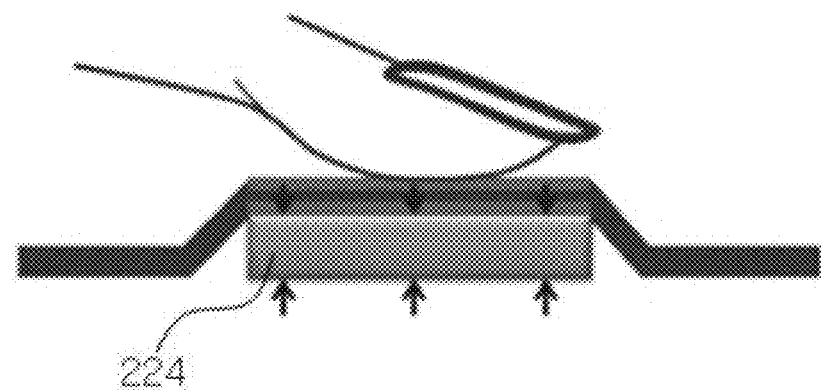
Figure 6C:
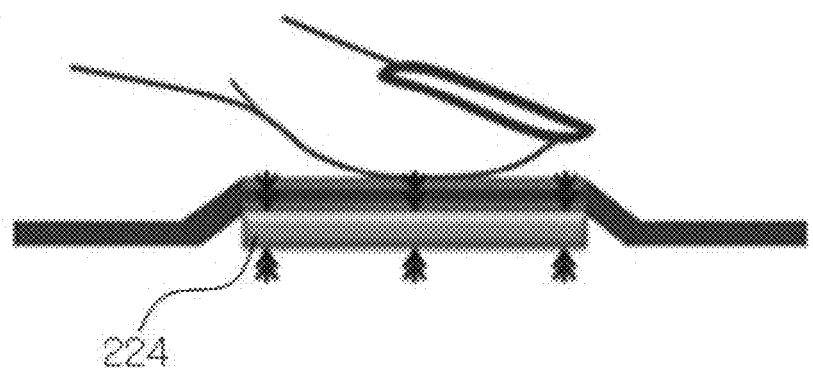

FIGS. 6A, 6B and 6C are exemplary diagrams illustrating a principle for returning a physical stimulation according to the exemplary embodiment of the present invention.

As shown in FIG. 6A, if the user does not apply pressure to a light transmitting region, some of the light passing through the core layer are emitted to the outside through all the formed photo elastic layers, and physical properties in the electronic elastic layer do not vary.

In FIG. 6B, if the user applies first pressure to a predetermined light transmitting region, some of the light passing through the core layer are emitted to the outside through a light transmitting region to which the pressure is applied. However, because the amount of light emitted to the outside in FIG. 6B is reduced in comparison with the case of the FIG. 6A, an amount of totally reflected and transmitted light is increased. An electric signal corresponding to the first pressure is applied to the electric elastic layer 224 such that physical properties in the electric elastic layer 224 vary, that is, the electric elastic layer 224 is significantly contracted upward and downward.

In FIG. 6C, if the user applies second pressure higher than the first pressure to a predetermined light transmitting region, an external path of the light transmitting region is blocked such that the light passing through the core layer is not emitted to the outside. An electric signal corresponding to the second pressure is applied to the electric elastic layer such that the physical properties in the electric elastic layer vary, that is, the electric elastic layer is contracted upward and downward larger than that of FIG. 6A.

Figure 7:
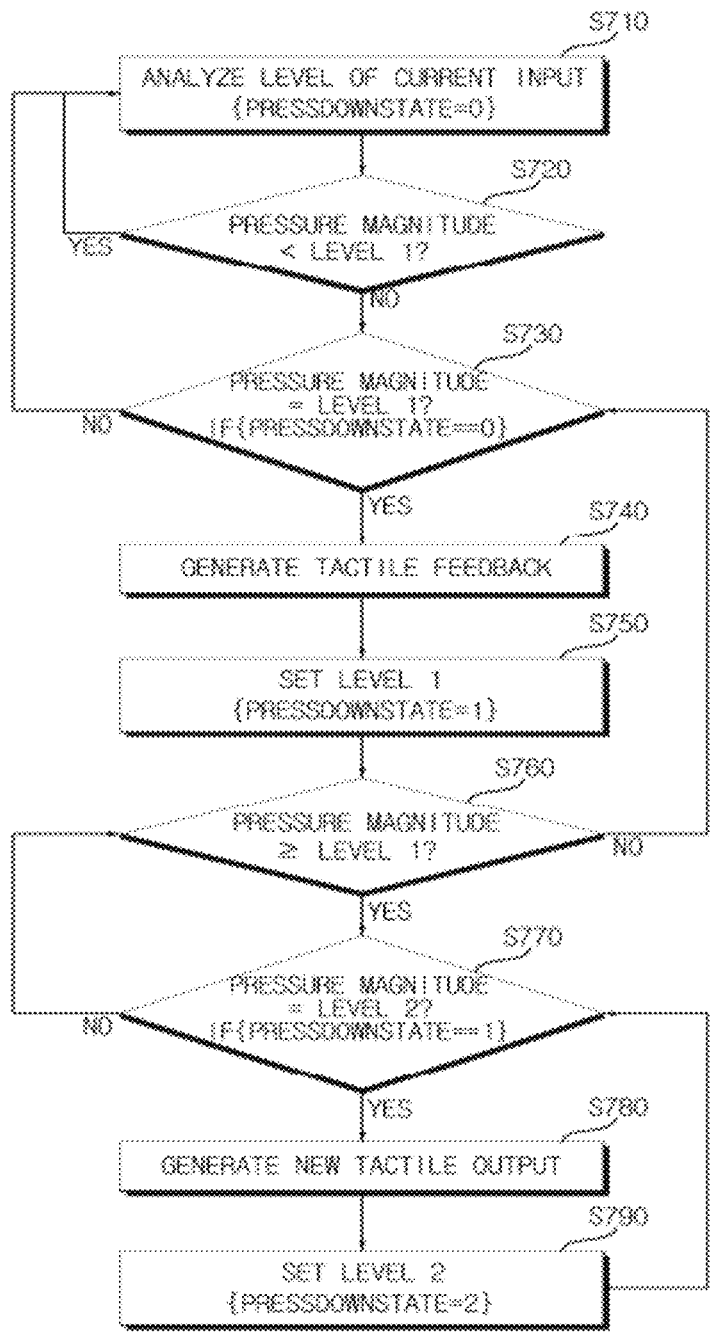
FIG. 7 is an exemplary diagram illustrating a process of processing a physical stimulation according to the exemplary embodiment of the present invention.

FIG. 7 is an exemplary diagram illustrating a process of processing a physical stimulation according to the exemplary embodiment of the present invention.

FIG. 7 shows in detail a process of applying how to feedback if pressure corresponding to a desired operation is applied using an input device.

First, when there is no pressure, the input device sets a variable PressDownState to zero (PressDownState=0) (S710). If the pressure is applied, the input device determines whether a magnitude of the applied pressure is lower than a level 1 (S720). When the magnitude of the applied pressure is not lower than the level 1, the input device may determine whether the magnitude of the applied pressure is level 1 (S730).

That is, when the user increases the pressure applied to an upper part of the input device constant so that the magnitude of the pressure reaches first pressure or the level 1, a physical stimulation or tactile feedback is generated (S740). In this case, when the magnitude of the pressure reaches level 1 using the variable PressDownState, a tactile output is generated only once. That is, before the pressure is applied again in a state that pressure lower than or equal to the level 1 is applied, generated tactile feedback is not regenerated.

Next, in case where there is no input, if pressure at level 1 is applied in a state that the variable PressDownState is set to zero (PressDownState=0), the variable PressDownState is set to 1 (PressDownState=1) (S750).

Subsequently, if the pressure is continuously applied, the input device determines whether the magnitude of the pressure is equal to or higher than level 1 (S760). When the magnitude of the pressure is equal to or higher than level 1, the input device may determine whether the magnitude of the pressure is at level 2 (S770).

That is, when the magnitude of the pressure exceeds level 1 and reaches level 2, the user generates a new tactile output (S780). In this case, a tactile output when the pressure reaches level 2 provides another pattern having intensity higher than intensity or having the stimulation number greater than the stimulation number when the pressure reaches level 1 such that a user may intuitively know the applied pressure by oneself. In this case, as described above, when the pressure reaches level 2, a moment tactile output is generated only once.

Next, if pressure of level 2 is applied in a state that the variable PressDownState is set to 1 (PressDownState=1) at pressure of level 1, the variable PressDownState is set to 2 (PressDownState=2) (S790).

In this case, before the magnitude of the pressure is reduced to level 2 or less and then is increased, for example, before the magnitude of the pressure is reduced to level 1 and then is increased to level 2, a tactile output corresponding to level 2 is not generated. In this case, only when the pressure is continuously increased using a variable PressDownState in a previous state, the tactile output is generated.

FIG. 8 is an exemplary diagram illustrating a method for sensing pressure according to an exemplary embodiment of the present invention.

As shown in FIG. 8, an input device according to an exemplary embodiment of the present invention may radiate light to an optical waveguide panel, and radiate light in a transverse direction and a longitudinal direction of the optical waveguide panel, respectively (S810).

Next, the input device may detect an amount of light passing through the optical waveguide panel (S820), and determine intensity and a location of pressure according to the detected amount of the light (S830). Here, the intensity of the pressure may be divided into first pressure and second pressure, and may be divided into two or more as needed.

Next, the input device may generate an electric signal corresponding to the intensity of pressure, and apply the generated electric signal to a region to which the pressure of the optical waveguide panel is applied based on the location of the pressure (S840). That is, the input device may apply a first electric signal to a region to which pressure is applied according to first pressure and a second electric signal to a region to which the pressure is applied according to second pressure, so as to transfer different physical stimulations to a user according to the intensity of the pressure.

As described above, the apparatus and the method for sensing pressure using an optical waveguide according to the exemplary embodiments of the present invention have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for sensing pressure using an optical waveguide sensor, the apparatus comprising:
   a light source radiating light;
   an optical waveguide panel totally reflecting and transmitting the radiated light in which an upper part of the optical waveguide panel has a plurality of light transmitting regions, wherein a first portion of the radiated light is emitted to an outside through the plurality of light transmitting regions, and a second portion of the radiated light is totally reflected and transmitted, and wherein an amount of the second portion of the radiated light is changed in accordance with a pressure applied to at least one of the plurality of light transmitting regions;

a detector detecting the amount of the second portion of the radiated light; and an analyzer determining a magnitude of the pressure and a location where the pressure is applied based on the detected amount of the second portion of the radiated light.

2. The apparatus of claim 1, wherein the optical waveguide panel includes:

a first cladding layer;

a core layer disposed on an upper portion of the first cladding layer and having a grating pattern, the core layer totally reflecting and transmitting the second portion of the radiated light; and a second cladding layer disposed directly on an upper portion of the core layer and including holes in the light transmitting regions, wherein the holes are separated from each other by a predetermined distance and the first portion of the radiated light is emitted to the outside through the holes.

3. The apparatus of claim 2, wherein the optical waveguide panel further includes an electric elastic layer disposed in a lower portion of the first cladding layer, and receiving an electric signal such that physical properties of the electric elastic layer vary with the magnitude of the pressure applied to the at least one of the light transmitting regions.

4. The apparatus of claim 3, wherein when the electric elastic layer receives the electric signal, the physical properties of the electric elastic layer vary in a direction parallel to top and bottom surfaces of the electric elastic layer.

5. The apparatus of claim 3, wherein when the electric elastic layer receives the electric signal, the physical properties of the electric elastic layer vary in a direction perpendicular to top and bottom surfaces of the electric elastic layer.

6. The apparatus of claim 1, wherein the amount of the second portion of the radiated light increases as the magnitude of the applied pressure increases, and the amount of the second portion of the radiated light decreases as the magnitude of the applied pressure decreases.

7. An apparatus for sensing pressure using an optical waveguide sensor, the apparatus comprising:

a light source radiating light;

an optical waveguide panel totally reflecting and transmitting the radiated light in which an upper part of the optical waveguide panel has a plurality of light transmitting regions, wherein a first portion of the radiated light is emitted to an outside through the plurality of light transmitting regions, and a second portion of the radiated light is totally reflected and transmitted, and wherein an amount of the second portion of the radiated light is changed in accordance with a pressure applied to at least one of the plurality of light transmitting regions;

a detector detecting the amount of the second portion of the radiated light; and an analyzer determining a magnitude of the pressure and a location where the pressure is applied based on the detected amount of the second portion of the radiated light, wherein when the optical waveguide panel receives an electric signal from the analyzer according to the magnitude of the pressure, and physical properties of the optical waveguide panel vary in a region to which the pressure is applied.

8. The apparatus of claim 7, wherein when the optical waveguide panel receives the electric signal, the physical properties of the optical waveguide panel vary in a direction parallel to top and bottom surfaces of the optical waveguide panel.

9. The apparatus of claim 7, wherein when the optical waveguide panel receives the electric signal, the physical properties of the optical waveguide panel vary in a direction perpendicular to top and bottom surfaces of the optical waveguide panel.

10. The apparatus of claim 7, wherein the amount of the second portion of the radiated light increases as the magnitude of the applied pressure increases, and the amount of the second portion of the radiated light decreases as the magnitude of the applied pressure decreases.

11. A method for sensing pressure using an optical waveguide sensor, the method comprising:

radiating light to an optical waveguide panel to emit a first portion of the radiated light to an outside through a plurality of light transmitting regions, and transmit a second portion of the radiated light by total reflection, wherein an amount of the second portion of the radiated light is changed in accordance with a pressure applied to at least one of the plurality of light transmitting regions;

detecting the amount of the second portion of the radiated light; and determining a magnitude of the pressure and a location where the pressure is applied based on the detected amount of the second portion of the radiated light.

12. The method of claim 11, further comprising:

applying an electric signal to a region of the optical waveguide panel to which the pressure is applied according to the magnitude of the pressure; and varying physical properties of the region according to the electric signal.

13. The method of claim 12, wherein the varying of the physical properties includes varying the physical properties in a direction parallel to a top surface of the region.

14. The method of claim 12, wherein the varying of the physical properties includes varying the physical properties in a direction perpendicular to a top surface of the region.

15. The method of claim 11, wherein the amount of the second portion of the radiated light increases as the magnitude of the applied pressure increases, and the amount of the second portion of the radiated light decreases as the magnitude of the applied pressure decreases.

16. The apparatus of claim 2, wherein the predetermined distance between two adjacent holes is not greater than 1 mm.

* * * * *